Feb. 6, 1951 E. H. HUGENHOLTZ 2,540,333

DEVICE FOR AUTOMATIC FREQUENCY CORRECTION

Filed Dec. 23, 1947

INVENTOR
E. H. HUGENHOLTZ
BY Fred M Vogel
AGENT

Patented Feb. 6, 1951

2,540,333

UNITED STATES PATENT OFFICE 2,540,333

DEVICE FOR AUTOMATIC FREQUENCY CORRECTION

Eduard Herman Hugenholtz, Eindhoven, Netherlands, assignor to Hartford National Bank and Trust Company, Hartford, Conn., as trustee Application December 23, 1947, Serial No. 793,493
In the Netherlands December 31, 1946

7 Claims. (Cl. 250—36)

This invention relates to devices for automatic frequency correction for maintaining a determined frequency difference between a control oscillation and an oscillation the frequency of which is to be corrected. The latter may be constituted, for example, by a voltage of a transmitting oscillator the frequency of which is roughly adjustable.

In devices of this kind a voltage of difference frequency is generated by mixture of the control oscillation and the oscillation the frequency of which is to be corrected, the polarity and value of the said difference frequency being dependent upon the polarity and value of the frequency deviation which is to be corrected.

Applicant has found that known devices of the type described, more particularly with high sensitivity of the control circuit and a correspondingly restricted control range, exhibit not only the stable working point that is desired but also other stable working points that are not desired.

As applicant has further found, such undesirable stable working points occur as a result of stabilisation on a difference frequency having a value corresponding to the desired difference frequency but of opposite polarity.

According to the invention, in devices of the kind described undesirable stabilisation on this mirror frequency is avoided by blocking the control cascade in accordance with the polarity of the frequency difference between the control oscillation and the oscillation the frequency of which is to be corrected.

The control cascade may be blocked by means of an auxiliary voltage having a polarity which is dependent on that of the frequency difference. For generating such voltage use may be made of any arbitrary frequency-discriminator circuits suitable for the purpose.

For generating the voltage blacking the control cascade use is preferably made of a so-called "rotary-field discriminator." If the voltage of difference frequency required for generating the control voltage is obtained by multiplicative mixture of the control oscillation and the oscillation the frequency of which is to be corrected, the mixing system used for this purpose may serve also as one of the mixing systems of the rotary-field discriminator.

In order that the invention may be clearly understood and readily carried into effect, it will now be described more fully by reference to the accompanying drawing.

Figures 1, 2:
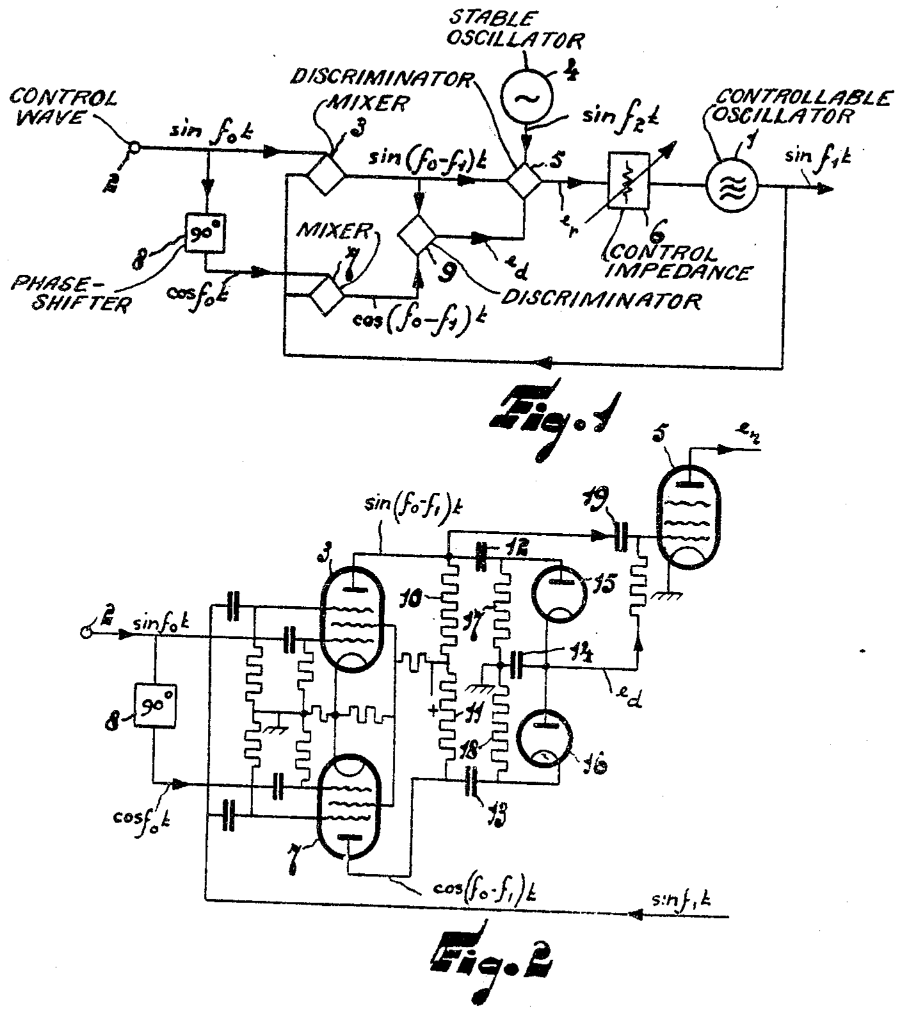
Fig. 1 shows a unipolar block diagram of a device according to the invention.
Fig. 2 shows the circuit diagram of an advantageous form of rotary-field discriminator which is preferably to be used.

In Fig. 1, reference numeral 1 indicates an oscillator having a frequency $f_1$ which is to be stabilised with respect to a control oscillation (sin $f_0t$) supplied at 2, in such manner that $f_0$ is greater than $f_1$ and the difference in frequency corresponds to a frequency $f_2$. For this purpose a voltage of difference frequency sin $(f_0-f_1)t$ obtained by mixture 3 of the frequencies $f_0$ and $f_1$ is supplied, together with a voltage derived from a stable oscillator 4 and exhibiting the required difference frequency $f_2$, to a phase discriminator 5 (sometimes referred to as "Beat discriminator") which is for example of the hexode mixing tube type. In the output circuit of this discriminator, in the case of synchronism of the oscillations supplied thereto, a direct voltage $e_r$ occurs having a polarity and value which are dependent on the polarity and the value of the phase difference between the oscillations sin $(f_0-f_1)t$ and sin $f_2t$. Supplying the output voltage $e_r$ of the phase discriminator 5 to a control impedance, for example a reactance tube circuited as a variable inductance, which acts upon the natural frequency of the oscillator 1 has the effect that the desired frequency difference between the control oscillation and the oscillation the frequency of which is to be corrected is automatically maintained provided that the time-constant of the control cascade 3, 5, 6 is of sufficiently small value. Stabilisation occurs with $f_0>f_1$ or $f_0<f_1$ according as a positive phase difference between the voltage of difference frequency sin $(f_0-f_1)t$ and the voltage sin $f_2t$ brings about an increase or a decrease of frequency $f_1$.

According to the invention, if a stabilisation is desired which is such that $f_0>f_1$, stabilisation is required to be avoided at frequencies at which $f_0<f_1$.

In order to avoid stabilisation on the mirror frequency, at which hence $f_0-f_1=f_2$, discriminator 5 is blocked by a voltage $e_d$, if $f_0<f_1$.

For generating the blocking voltage use may be made, for example, of a so-called comparative counting discriminator in which the zero passages of the two oscillations the frequencies of which are to be compared are counted and their numbers compared during units time which are equal but otherwise may be of any arbitrary value. Such counting discriminators are responsive only at a determined difference frequency, for example of some few cycles per second, in accordance with the unit time chosen. Although this is not objectionable when used in the instance under consideration, if only the difference frequency to be adjusted is considerably higher than the minimum responsive frequency, it is desirable, in order that undesirable stabilisations may be avoided with security, that the blocking voltage should be generated by means of a so-called rotary-field discriminator. As is well-known, such a discriminator procures, even at difference frequencies lower than 1 cycle per second, a direct voltage having a polarity which is dependent on that of the difference frequency but a value which is substantially independent of that of the difference frequency.

As shown in Fig. 1, such rotary-field discriminator substantially comprises two multiplicative mixing systems 3 and 7, to which the frequency to be corrected and the control oscillation are supplied with equal phase and with a mutual phase shift 8 of 90° respectively (sin $f_0t$ and cos $f_0t$ respectively). It may be mentioned here that the oscillation to be corrected and the control oscillation are interchangeable.

The voltages of difference frequency which are derived from the two mixing systems and which may be represented by sin $(f_0-f_1)t$ and cos $(f_0-f_1)t$ exhibit a phase shift of 90°, the polarity of which is dependent on that of the frequency difference. Consequently, supplying these beat voltages which are phase-shifted by 90° to a phase discriminator 9 procures a direct voltage $e_d$ having a polarity which is dependent on that of the frequency difference. With negative polarity this direct voltage blocks the mixing system 5 in the control cascade 3—6 of the generator 1.

For reasons of economy the mixing system 3 of the normal AFC control cascade 3—6 also forms part of the rotary-field discriminator 3, 7, 9.

Fig. 2 shows in detail an advantageous circuit arrangement for the elements 3, 7, 8 and 9 of Fig. 1. In this case the control oscillation is supplied directly to the control grid of the first pentode mixing tube 3 and, via a phase-shifting network 8, to the control grid of a second pentode mixing tube 7. The voltage that is to be corrected in frequency is supplied in phase to the suppressor grids of the mixing tubes 3, 7. The anode circuits of the two mixing tubes include resistances 10 and 11 respectively, which exhibit the aforementioned voltages of difference frequency which are shifted in phase by 90°. The polarity of this phase shift varies with the polarity of the difference in the frequency between $f_0$ and $f_1$.

The beat voltages set up at the resistances 10 and 11 and shifted in phase by 90° are supplied, via blocking condensers 12, 13, to a phase discriminator comprising an output condenser 14 and two diodes 15 and 16 which are connected in opposition with the said output condenser. These electrodes of the diodes 15 and 16 which are remote from the output condenser are earthed via resistances 17, 18, as well as one side of the output condenser 14.

In this phase discriminator, which is known per se, the diodes 15, 16 may be regarded as a voltage divider provided that the potential of the anode of the diode 15 exceeds that of the cathode of diode 16. The two diodes are blocked as soon as the anode of diode 15 becomes negative with respect to the cathode of diode 16. Consequently, the condenser 14 acquires a positive voltage if the voltage set up at resistance 10 (or 17) leads with respect to that of resistance 11 (or 18) whereas a negative output voltage occurs as soon as the voltage set up at resistance 11 (or 18) is leading.

The output voltage of the condenser 14 is used to block the mixing system 5 (shown as a pentode) in the AFC control cascade 3—6 and in view thereof this output voltage is supplied as a biassing potential to the control grid of mixing tube 5.

The voltage of difference frequency set up at the mixing tube 3 of the rotary-field discriminator is supplied, via a blocking condenser 19, to the control grid of mixing tube 5 for the purpose of economizing an additional mixing system.

In the rotary-field discriminator 3, 7, 14—18 as shown, control oscillations which are shifted in phase by 90° (8) are supplied to the mixing systems 3, 7. It is also possible to utilise a smaller or greater phase shift which, however, results in a small output voltage $e_d$ when use is made of the phase discriminator 14—18 shown in Fig. 2.

What I claim is:

1. Automatic-frequency-correction apparatus for maintaining the frequency of a controllable oscillation generator at a desired value relative to the frequency of a control wave whose frequency differs from said desired value, said apparatus comprising a source of stable oscillations having a frequency corresponding to the difference between said control wave and the desired value of said generator, discriminator means to compare an intermediate wave whose frequency corresponds to the difference between said control wave and the output oscillations of said generator with said stable oscillations to produce a control voltage having, in the case of a disparity between the frequency of said intermediate wave and said stable oscillations, a frequency corresponding to said disparity, and in the case of frequency synchronism between said intermediate wave and said stable oscillations, a magnitude and polarity depending on the phase displacement therebetween, a voltage-responsive control impedance coupled to said generator to vary the frequency thereof, means to apply said control voltage to said impedance to vary the frequency and phase of said generator in accordance therewith, and means responsive to the frequency difference between said generator and said control wave and coupled to said discriminator means to render same inoperative when the frequency of said generator differs from the frequency of said control wave in one predetermined sense, said discriminator being rendered operative in the other sense.

2. Automatic-frequency-correction apparatus for maintaining the frequency of a controllable oscillation generator at a desired value relative to the frequency of a control wave whose frequency differs from said desired value, said apparatus comprising a source of stable oscillations having a frequency corresponding to the difference between said control wave and the desired value of said generator, means to mix the oscillations in the output of said generator with said control wave to produce an intermediate wave whose frequency corresponds to the difference therebetween, a beat discriminator to compare said intermediate wave with said stable oscillations to produce a control voltage having, in the case of a disparity between the frequency of said intermediate wave and said stable oscillations, a frequency corresponding to said disparity and, in the case of frequency synchronism between said intermediate wave and said stable oscillations, a magnitude and polarity depending on the phase displacement therebetween, a voltage-responsive control impedance coupled to said generator to vary the frequency thereof, means to apply said control voltage to said impedance to vary the frequency and phase of said generator in accordance therewith, and means coupled to said beat discriminator to render same inoperative when the frequency of said generator differs from the frequency of said control wave in one predetermined sense, said discriminator being operative in the other sense.

3. Automatic-frequency-correction apparatus for maintaining the frequency of a controllable oscillation generator at a desired value relative to the frequency of a control wave whose frequency differs from said desired value, said apparatus comprising a source of stable oscillations having a frequency corresponding to the difference between said control wave and the desired value of said generator, a mixing device to mix the oscillations in the output of said generator with said control wave to produce an intermediate wave whose frequency corresponds to the difference therebetween, a beat discriminator to compare said intermediate wave with said stable oscillations to produce a control voltage having, in the case of a disparity between the frequency of said intermediate wave and said stable oscillations, a frequency corresponding to said disparity and, in the case of frequency synchronism between said intermediate wave and said stable oscillations, a magnitude and polarity depending on the phase displacement therebetween, a voltage-responsive control impedance coupled to said generator to vary the frequency thereof, means to apply said control voltage to said impedance to vary the frequency and phase of said generator in accordance therewith, means to produce an auxiliary voltage having a polarity which is dependent on the sense in which the frequency of said generator differs from said control wave, and means to apply said auxiliary voltage to said beat discriminator to render same inoperative solely in one polarity of said auxiliary voltage.

4. An arrangement, as set forth in claim 3, wherein said means to produce an auxiliary voltage comprises an auxiliary mixing device to mix the oscillations in the output of said generator with said control wave to produce an auxiliary intermediate wave whose frequency corresponds to the difference therebetween, means to impart a 90 degree phase shift to the control wave applied to said auxiliary mixing device, and a phase discriminator coupled to the output of both said mixing device and said auxiliary mixing device to produce an auxiliary voltage whose polarity depends on the phase displacement between said intermediate wave and said auxiliary intermediate wave and thereby on the sense in which the frequency of said generator differs from said control wave.

5. Automatic-frequency-correction apparatus for maintaining the frequency of a controllable oscillation generator at a desired value relative to the frequency of a control wave whose frequency differs from said desired value, said apparatus comprising a source of stable oscillations having a frequency corresponding to the difference between said control wave and the desired value of said generator, a first mixing device to mix the oscillations in the output of said generator with said control wave to produce a first intermediate wave whose frequency corresponds to the difference therebetween, a beat discriminator to compare said first intermediate wave with said stable oscillations to produce a control voltage having, in the case of a disparity between the frequency of said intermediate wave and said stable oscillations, a frequency corresponding to said disparity, and in the case of frequency synchronism between said intermediate wave and said stable oscillations, a magnitude and polarity depending on the phase displacement therebetween, a voltage-responsive control impedance coupled to said generator to vary the frequency thereof, means to apply said control voltage to said impedance to vary the frequency and phase of said generator in accordance therewith, a second mixing device to mix the oscillations in the output of said generator with said control wave to produce a second intermediate wave whose frequency corresponds to the difference therebetween, a 90 degree phase shifting network for imparting a phase shift to the control wave applied to said second mixing device, a phase discriminator coupled to the outputs of both of said mixing devices to produce an auxiliary voltage whose polarity depends on the sense in which the frequency of said generator differs from said control wave, and means to apply said auxiliary voltage to said beat discriminator to block same solely in one polarity of said auxiliary voltage.

6. Apparatus, as set forth in claim 5, wherein said first and second mixing devices are constituted by a pair of electron discharge tubes each having a cathode, at least two grids and an anode, the cathodes of said tubes being interconnected, means to apply oscillations from said generator to one pair of corresponding grids in said tubes, means to apply the control wave to the other grid of one of said tubes, means to apply the control wave through said phase shifting network to the other grid of the other of said tubes, a pair of anode impedances each connected respectively to the anodes of said tubes, whereby said first and second intermediate frequency waves are developed across said anode impedances.

7. An arrangement, as set forth in claim 6, wherein said phase discriminator comprises a pair of series connected diodes each provided with a cathode and a plate, the cathode of one diode being connected to the plate of the other diode, a pair of resistance elements each coupled between the plate and cathode of a respective diode, the plate of the one diode being coupled to the anode of one of said tubes and the cathode of the other diode being coupled to the anode of the other of said tubes, and means for deriving the auxiliary voltage from between the junction of said diodes and the anode of one of said tubes.

EDUARD HERMAN HUGENHOLTZ.

REFERENCES CITED

The following references are of record in the file of this patent:

UNITED STATES PATENTS

| Number | Name | Date |
|---|---|---|
| 2,296,919 | Goldstine | Sept. 23, 1942 |